July 22, 1969  F. J. HEIL  3,456,449
CABLE-LAYING APPARATUS AND METHOD OF LAYING CABLE
Filed April 18, 1966  2 Sheets-Sheet 1
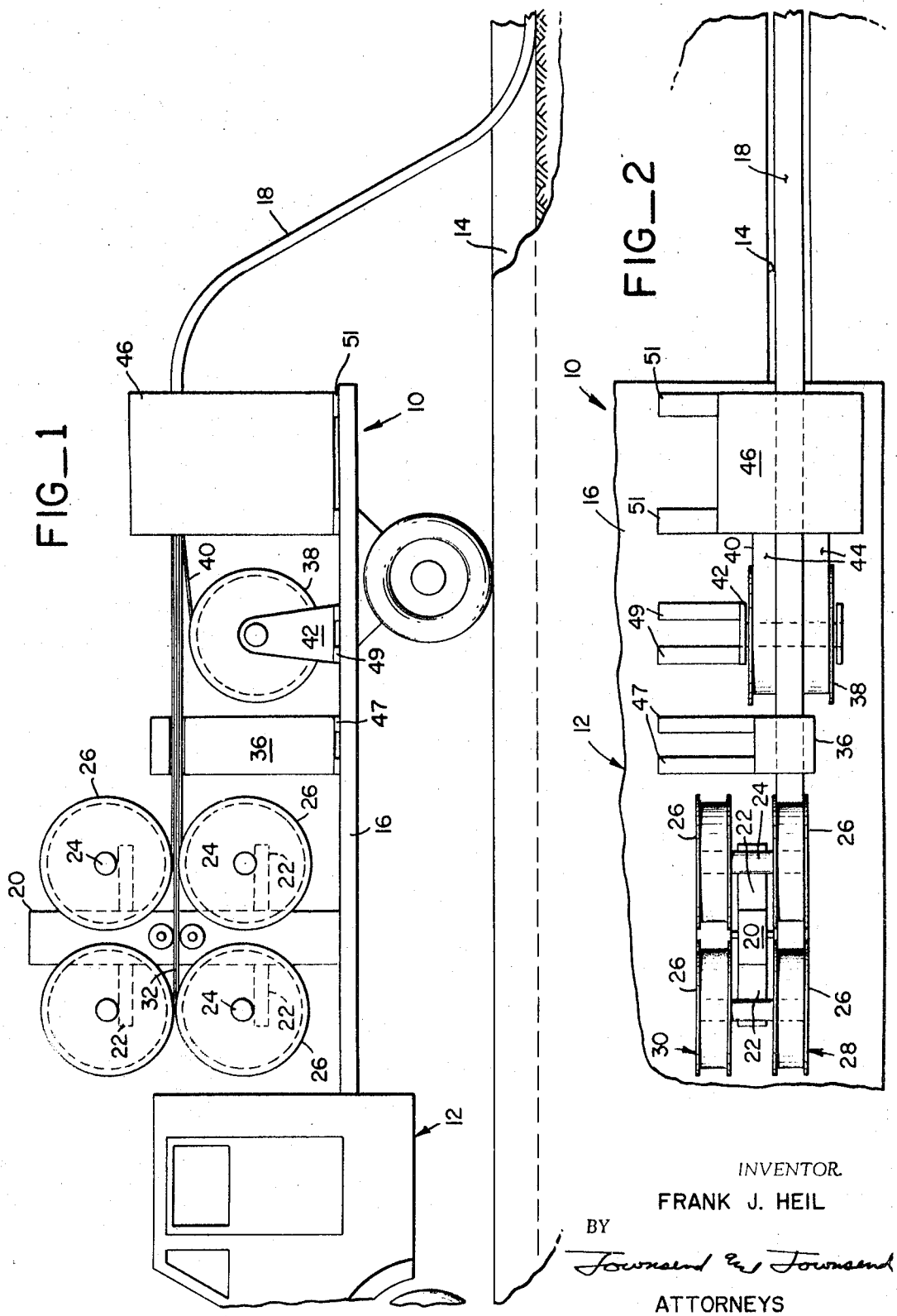
INVENTOR.
FRANK J. HEIL
BY
Townsend & Townsend
ATTORNEYS July 22, 1969  F. J. HEIL  3,456,449
CABLE-LAYING APPARATUS AND METHOD OF LAYING CABLE
Filed April 18, 1966  2 Sheets-Sheet 2
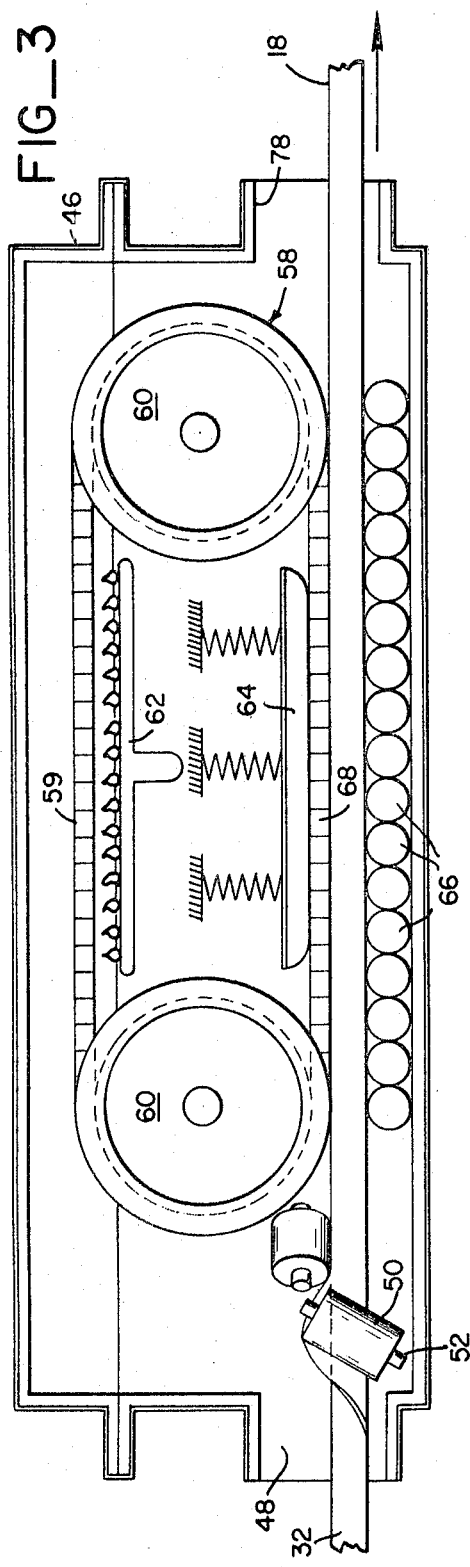
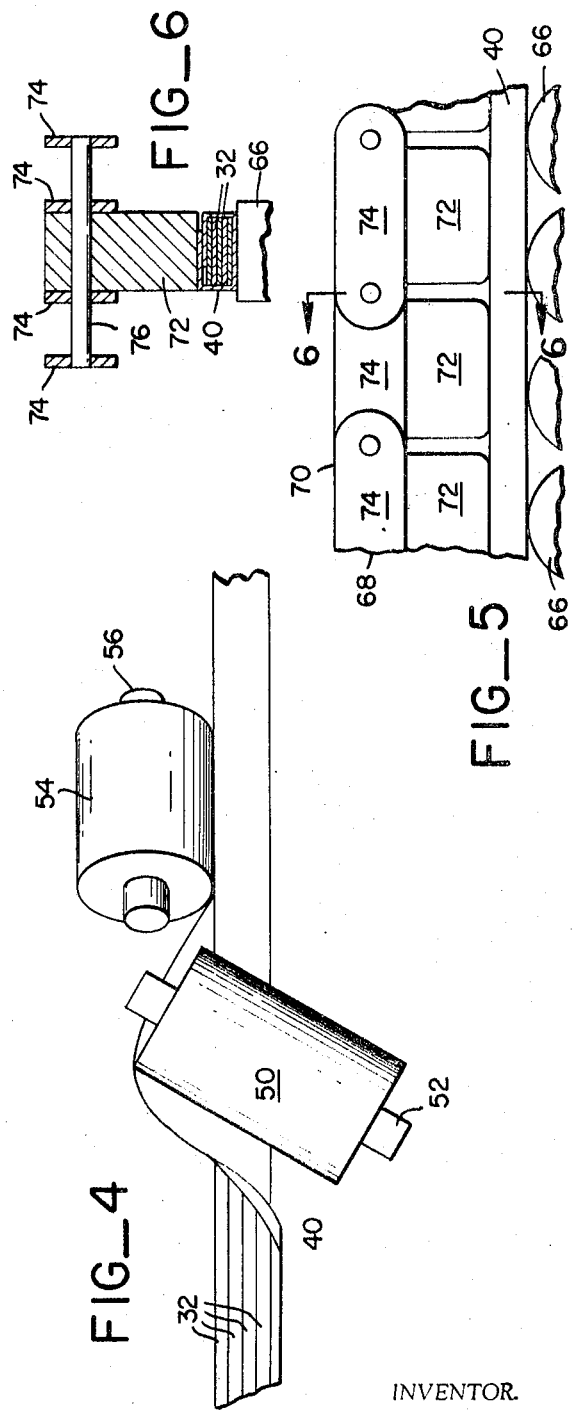
INVENTOR.
FRANK J. HEIL
BY
Townsend & Townsend
ATTORNEYS

United States Patent Office 3,456,449
Patented July 22, 1969

3,456,449
CABLE-LAYING APPARATUS AND METHOD OF LAYING CABLE
Frank J. Heil, Winters, Calif., assignor of twenty percent to Albert H. Rominger, Donald A. Rominger, and Richard E. Rominger, copartners, doing business as A. H. Rominger & Sons, Winters, Calif.
Filed Apr. 18, 1966, Ser. No. 543,348
Int. Cl. E02f 5/00; H02g 1/06; B21f 21/00
U.S. Cl. 61—72.6        11 Claims

ABSTRACT OF THE DISCLOSURE

A cable-laying apparatus and method wherein cables in strap form are wound on a plurality of reels carried by a vehicle with the cables being unwound from the reels as the vehicle moves forwardly. The cables are bound together to form a unit and then are wrapped with a suitable wrapping material before they are deposited on or in the ground due to the forward motion of the vehicle.

---

This invention relates to improvements in the laying of a multistrand cable in the ground and, more particularly, to a method and apparatus for accomplishing this function simultaneously with the construction of the cable from metal straps of rectangular cross-section.

In its broadest sense, the apparatus of this invention comprises a vehicle movable over the ground adjacent to a trench formed therein, the vehicle being provided with reels having individual cable strands in strap form wound thereon and means for joining the strands together to form a multistrand cable as the individual strands are unwound from their reels. The purpose of the apparatus is to first form the multistrand cable and immediately thereafter lay the same in or on the ground as the vehicle moves in the direction in which it is desired that the cable extend. In this way, a cable capable of carrying relatively large power loads may be formed on the jobsite immediately before it is laid on or in the ground so as to preclude the necessity to fabricate the cable at a manufacturing location and to transport the same in relatively long, inflexible lengths to the jobsite.

The method of the invention is directed to the successive steps of unwinding a number of individual metal straps in coil form, joining the individual straps as a cable unit, and then depositing the cable unit on the ground, all of which is accomplished as the coils are moved in a predetermined direction over the ground. An additional step of covering the formed cable unit may be employed in combination with the foregoing steps to more adequately prepare the cable unit for deposit on or in the ground.

Underground power transmission lines are generally preferred over the conventional overhead power lines when the lines extend over relatively great distances. This manner of positioning lines for operation provides a permanent installation, it eliminates substantial maintenance problems and overcomes difficulties encountered in using overhead transmission lines. The advantages of underground transmission lines are well established; however, the need for improvements in the laying of underground cable is recognized especially in view of the expense and labor involved in laying underground cable by conventional methods.

Transmission lines made from metal straps of rectangular cross section allow the long distance transfer of large amounts of electrical energy in an economical manner because of the relatively low heat and radiation losses resulting from their use. This type of line, however, has generally been limited in use because a cable made from a number of interconnected flat metal straps is relatively inflexible and cannot be wound on a drum or spool after it has been formed. It would be necessary to fabricate the cable in segments and to transport them in long, straight lengths to a jobsite and then join them in end-to-end relationship to complete the cable installation. The many steps of this procedure would render the same expensive and time consuming and would require considerable equipment and man power to provide an efficient installation. Thus, it has not been feasible to use multistrap cables as transmission lines.

The present invention improves upon the conventional methods of laying underground cable and represents a distinct advance in the art by virtue of the fact that strap cables of various dimensions and load carrying capacities may be feasibly constructed at the installation site and immediately prior to the laying of the cable on or in the ground. Thus, the problems of transporting factory-made strap cables to a jobsite and then joining the cables at spaced intervals are circumvented. By using the teachings of this invention, individual strands in strap form for forming the cables are supplied in reel form, the cable reels being adjacent to each other and capable of being rotated so that the individual cable strands thereof can be removed therefrom and joined together to form the multistrap cable which is desired to be laid on or in the ground. The cable-laying method of the invention is enhanced by the fact that the cable reels are carried on a vehicle which allows the reels to be moved over the path along which the cable is to be laid.

Individual cable strands of different sizes and construction may be utilized in carrying out the teachings of this invention. The dimensions of each strand are dependent upon the load which the formed or finished cable is required to withstand. The electrical power carrying capacity of a cable is dependent upon the cross-section of the cable itself, and in many situations, the cable must be of relatively large cross-section in order to limit the radiation or heating losses. The present invention permits the construction of laminated, heavy duty, relatively inflexible cables from flexible, reel-mounted straps by joining a number of the straps at the site of installation as the straps are unwound from their reels before being joined together. Moreover, the vehicle which carries the reels may be such as to accommodate several banks of reels. This allows one bank of reels to be resupplied with straps while another bank of reels is being used to form the cable. This advantage results in substantially uninterrupted operation of the cable forming and laying process and thereby a more efficient operation than can be accomplished with methods heretofore relied upon.

Another distinct advantage of the invention is the fact that manpower requirements are minimal and, as a result, a high quality cable can be effectively constructed and laid in a minimum of time and with a minimum of effort. The invention also permits the cable-forming and -laying method to be efficiently carried out without a large investment in equipment. The components of the apparatus for carrying out the method are, for the most part, commercially available and the combining of the components results in an assembly which is simple and rugged in construction and is substantially maintenance-free except for the resupplying of cable straps or strands to the reels at periodic intervals so that the process may proceed in an uninterrupted fashion. Since an underground cable should be covered to protect it against the corrosive effects of subterranean minerals, a plastic cover may be applied to the cable formed by the present method after the individual strands have been joined together. This cover preferably is in the form of a flexible strip wound on a reel positioned downstream of the location at which the cable strands are joined. Thus, the step of covering the joined strands can be accomplished as the latter move rearwardly relative to the vehicle.

It is preferred that the strands in strap form be joined in side-by-side relationship whereby to provide a cable of substantially uniform cross section throughout its entire length. The formed cable is quite stiff and resists bending. However, it has some degree of flexibility to permit it to extend rearwardly and downwardly from the vehicle for deposit on the ground. Substantially no power is required to rotate the reels once the cable is laid on the ground, since the cable will then be subjected to a drag force by virtue of its contact with the ground which, in turn, will cause the straps to be unwound from their reels as the vehicle moves over the ground.

It is, therefore, the primary object of this invention to provide by means of an apparatus and a method improvements in the laying of a multistrand cable on or in the ground wherein the significant feature of the invention resides in the fact that a laminated cable can be fabricated from a number of flat-sided, coiled metal straps at the jobsite and immediately prior to the laying of the cable in or on the ground whereby heavy duty underground cable can be economically constructed and installed and the quality and type of cable can be completely controlled at the jobsite to thereby circumvent the diverse difficulties encountered in the use of multistrap cables formed at a manufacturing site remote from the jobsite.

Another object of this invention is to provide improved apparatus for laying multistrap cable on or in the ground wherein the apparatus has a plurality of rotatable reels mounted on a vehicle, each reel having its own individual flexible cable strap wound thereon, whereby the individual straps can be used to form the cable upon being unwound from their reels and joined together, notwithstanding the relatively rigid character of the cable after it has been formed.

Still another object of the invention is to provide apparatus of the type described wherein several banks of the foregoing reels can be provided so that operation of the apparatus will be substantially continuous by virtue of the fact that one bank of reels can be used to form the finished cable while another bank can be resupplied with individual straps for subsequent use as the need arises.

A further object of the invention is the provision of an improved method of laying cable on or in the ground wherein a plurality of individual cable strands is provided in coil form and is unwound and joined together to form a cable unit as the cable coils are moved in a predetermined direction whereby the formed cable unit may be deposited on or in the ground as the cable coils move and after the individual strands have been joined together.

Other objects of this invention will become apparent as the specification progresses, reference being had to the accompanying drawings wherein:

FIG. 1 is a fragmentary, side elevational view of the apparatus of the invention showing the way in which a formed cable is placed in a trench in the ground after the cable has been formed and as the vehicle carrying the cable-forming strands moves over the ground along the trench;

FIG. 2 is a fragmentary, top plan view of the apparatus;

FIG. 3 is an enlarged internal view of the heat source for applying heat to the thermoplastic covering material for covering the formed cable;

FIG. 4 is an enlarged, fragmentary, side elevational view of the rollers used to wrap the covering material about the cable prior to the application of heat to the material;

FIG. 5 is an enlarged, fragmentary, side elevational view of the heat source; and FIG. 6 is a cross-sectional view taken along line 6—6 of FIG. 5.

SUMMARY OF THE INVENTION

The apparatus and method of this invention is directed to the forming of a cable from a number of straps initially disposed on a plurality of respective reels disposed on a vehicle which moves in a forward direction. The vehicle carries a cable-bounding unit to couple the straps together after they have payed out from the cable and prior to movement past a wrapping means for applying a cover or wrapper to the cable. The cable is laid on the ground as the vehicle moves forwardly and may be laid in a trench if one is provided.

The apparatus of this invention is broadly denoted by the numeral 10 and includes a vehicle 12 movable over the ground adjacent to a trench 14 formed in the ground and into which it is desired to place a cable constructed on the bed 16 of the vehicle. The formed or finished cable 18 extends rearwardly of vehicle 12 and downwardly into trench 14 as shown in FIG. 1 after cable 18 has been formed. The method for forming the same will be set forth hereinafter.

An upright support 20 is carried on bed 16 adjacent to the forward extremity thereof. Support 20 has a number of arms 22 extending for and aft, each arm being provided with a number of shafts 24 disposed transversely of the path of travel of the vehicle. A plurality of reels 26 are rotatably mounted in any suitable manner on respective ends of shafts 24 and, as shown in FIG. 2, reels 26 comprise a first bank 28 on one side of support 20 and a second bank 30 on the opposite side of the support. Also, FIG. 2 illustrates that the reels of each bank are substantially coplanar and are arranged in specific dispositions as shown in FIG. 1.

Each reel 26 has an individual cable strap or strand 32 wound thereon and being removable therefrom as the reel is rotated in the proper direction. The straps or strands 32 are flexible and are moved into dispositions in side-by-side relationship in the manner shown in FIGS. 1 to 6 when they are removed from respective reels 26. Thus, the way in which reels 26 of each of the banks 28 and 30 are mounted on respective shafts is important since it is desired that the group of strands extending rearwardly from the rearmost reels 26 be stacked or vertically aligned with each other to provide a laminated, heavy duty cable. To accomplish this, therefore, the lower reels 26 of each bank must rotate in clockwise sense when viewing FIG. 1; whereas the upper reels 26 of the bank must rotate in counterclockwise sense in order to remove the strands therefrom.

Support 20 is rigidly mounted on bed 16 at a location which permits the reels of one of the banks to be resupplied with cable strands as the reels of the other bank are being unwound. As will hereinafter be set forth, cable joining structure and cable covering structure are provided to initially join the strands unwound from a particular bank and thereafter covering the joined strands to form cable 18. The joining and covering structures are transversely shiftable on bed 16 so as to be selectively alignable with either of the banks. Thus, while the supply of cable strands from one of the banks is being used to form cable 18, the reels of the other bank may be resupplied and thereby be readied for subsequent use as the need arises.

Since the primary purpose of the formed cable is for electrical power transmission, it is clear that strands 32 will be of suitable, electrically conducting material. Thus, the strands will be capable of being joined together such as by a metal welding process or the like. To this end, a welding unit 36 is secured to bed 16 and extends upwardly therefrom for receiving strands 32 in stacked form and welding the strands together so that they become joined and form a unit which extends rearwardly in the manner shown in FIG. 1.

The assembly defined by the joined strands could then be laid on or in the ground; however, it is generally preferred that the cable be covered to protect it against the corrosive elements in the ground. To this end, a reel 38 having a web or strip 40 of covering material thereon is rotatably mounted on bed 16 by structure 42, reel 38 being disposed rearwardly of welding unit 36 as shown in FIG. 1. Strip 40 is preferably formed from a flexible length of thermoplastic material, the strip having a width greater than the transverse width of the joined strands so as to provide side portions 44 which can be wrapped about the strands to cover the same and thereby form cable 18.

The joined strands 32 pass over reel 38 and overlie strip 40, the latter extending tangentially and rearwardly of reel 38 as shown in FIGS. 1 and 2.

A housing 46 is disposed rearwardly of reel 38 and has an opening 48 which receives both strip 40 and the assembly comprising the joined strands.

Tracks 47, 49 and 51 are mounted on the upper surface of bed 16 and disposed transversely of the path of travel of vehicle 12. Welding unit 36, structure 42 and housing 46 are shiftably mounted on tracks 47, 49 and 51, respectively. Thus, these three components, namely unit 36, structure 42 and housing 46, may be shifted from positions aligned with bank 28 to positions aligned with bank 30. In this way, the operation of apparatus 10 will be substantially continuous inasmuch as the shifting of these compounds may be accomplished in a relatively short time and the reels in the standby bank can be replenished as the strands of the other bank are being used to form cable 18. In lieu of tracks 47, 49 and 51 a single track could be provided for support 20 if such were found feasible or desirable. Moreover, a single track could be provided for the three components to eliminate the three individual tracks 47, 49 and 51.

Adjacent to opening 48 is a pair of side rollers 50 which are canted in the manner shown in FIGS. 3 and 4, only one of rollers 50 being illustrated in these views. Rollers 50 are rotatably mounted in any suitable manner on shafts 52. The function of rollers 50 is to engage sides 44 of strip 40, whereupon the sides are folded upwardly along the sides of the assembly comprising strands 32.

Another roller 54 is disposed downstream of rollers 50 and is rotatably mounted in any suitable manner by means of shaft 56. The function of roller 54 is to fold the upper extremities of sides 44 so that these extremities then become interengaged and assure that strip 40 covers this assembly. A heat source 58 is disposed within housing 46 and includes a flexible, endless, heat-applying member 59 mounted for movement on a pair of spaced, rotatable, pulley-like members 60. A burner 62 is disposed within the region circumscribed by member 59 and in close proximity to the latter whereby member 59 is heated and imparts heat to the thermoplastic material of strip 40. Thus, strip 40 is sealed and effectively covers the joined strands 32 to form cable 18. Burner 62 may be supplied with fuel and controlled in any suitable manner so that it will impart a predetermined amount of heat depending upon the heat required to fuse the extremities of strip 40.

A spring biased pusher element 64 urges member 59 into firm engagement with strip 40 so as to apply pressure thereto sufficient to effect the aforesaid bond. Rollers 66 are disposed within housing 46 and engage the underside of strip 40 as pressure is applied to the bottom strip 68 of member 59 by element 64.

FIGS. 5 and 6 illustrate a preferred form of member 59, the latter including an endless, flexible link chain 70 having a plurality of heat conducting blocks 72 secured to respective links of chain 70 and projecting outwardly therefrom as shown in FIG. 5. The blocks 72 extend downwardly from stretch 68 and engage the upper extremity of strip 40. In this way, heat is transferred from blocks 72 to strip 40 by conduction, the period of time during which blocks 72 engage strip 40 being sufficient to effect the bond between the strip extremities. FIG. 6 illustrates the strip extremities 74 as the same are held against each other by one of the blocks 72. FIG. 6 further illustrates the various links 74 of chain 70 and the way in which pins 76 interconnect links 74 and blocks 72.

Housing 46 is provided with an outlet opening 78 aligned with opening 48 and the path between rollers 66 and stretch 68. The formed cable 18 after moving away from stretch 68 passes outwardly of housing 46 through opening 78 as it moves relative to housing 46.

In operation, apparatus 10 is initially provided with the various reels 26 on which are wound the individual cable straps or strands adapted to be used to form the multistrap cable. Although each bank of reels illustrated in FIGS. 1 and 2 is provided with four reels, it is clear that additional reels could be provided for if such is deemed necessary or desirable. The actual cable requirements will determine the number of reels and the type of cable straps to be used. One of the banks of reels is in standby condition while the other bank is in an operative condition as shown in FIG. 2.

The initial step of the method of the invention is to manually position the individual strands in welding unit 36 so that they will become interconnected and thereafter to advance the joined strands rearwardly toward and through housing 46. All of the foregoing may be accomplished by hand in view of the relatively flexible nature of the individual strands 32 and because of the straight line path along which the joined strands 32 pass as they move rearwardly through unit 36 and housing 46. Burner 62 will have been actuated and members 60 will be rotated in any suitable manner such as a motor coupled to one of the members. Since chain 70 preferably comprises a link chain, members 60 will comprise sprockets coupled with the chain.

After the end portion of cable 18 is formed by manually moving joined strands 32 and strip 40 through housing 46, the end of cable 18 is urged rearwardly and placed on the ground either by hand or by moving vehicle 12 forwardly. The method may then be practiced continuously or in an uninterrupted manner inasmuch as the drag force due to the cable laying on or in the ground will automatically cause reels 26 to rotate so as to unwind the respective strands 32 therefrom as vehicle 12 moves forwardly. Welding unit 36 is preferably of the type which spot-welds the strands 32 together so that the strands may be joined without interruption in their movement with respect to bed 16. However, in effect, the cable strands 32 do not move forwardly or rearwardly with respect to the ground; it is the vehicle which moves forwardly relative to the strands.

After the strands are joined and as vehicle 12 continues to move forwardly, the strands overlie strip 40 and both the strands and the strip move relative to bed 16 and into housing 46 through opening 48. Rollers 50 and 54 then fold strip 40 in the manner set forth above and blocks 72 impart heat to the side extremity of strip 40 so that the latter encloses the strands to form cable 18.

The foregoing steps in the formation of cable 18 continue so long as reels 26 are supplied with their individual strands 32. When one bank of reels 26 becomes depleted, the other bank is made operative by transversely shifting unit 36, structure 42 and housing 48 into alignment therewith. The change over from one bank to the other may be made in a minimum of time so as not to interrupt the cable-forming and -laying process to any appreciable extent.

The cable-forming and -laying process is then continued in the usual, uninterrupted manner. During this time, the depleted reels 26 may be resupplied with strands or completely replaced with fully supplied reels whichever is desired. This feature further minimizes the time required to form and lay a cable of a predetermined length and, as a result, minimizes the cost of operation of apparatus 10.

Apparatus 10 can be used with a conventional trench digger which conceivably could precede vehicle 12 and, quite possibly, could even be provided on the forward end of the vehicle if sufficient power were provided therefor. Also, an implement immediately following apparatus 10 could be employed to cover the trench so that the entire trench-digging, cable-forming, cable-laying and trench-covering procedure may be accomplished in a relatively short time and in a more efficient manner than is capable with conventional methods and apparatus. The only limitation on the speed of operation of apparatus 10 is the time required to effect the bond between the extremities of strip 40 whereby the cable strands are covered to form cable 18. This assumes, of course, that there is no appreciable time limitation with respect to welding unit 36 and it is reasonable to assume this in view of the advanced nature of presently available welding units. Specialized skill to perform the teachings of this invention is reduced to a minimum or is not required at all. The method can be accomplished and the apparatus can be operated by ordinary workmen having no special cable-forming or cable-laying experience.

What is claimed is:

1. Apparatus for forming a laminated cable and for laying the same on the ground comprising: a vehicle movable forwardly over the ground and having a supporting surface; a plurality of generally coplanar reels rotatably carried on said supporting surface, each reel having a flexible cable strap wound thereon and movable off the same rearwardly of the direction of travel of the vehicle as the corresponding reel rotates relative thereto, the reels being disposed to position their straps in proximity to each other as they leave the reels and move rearwardly thereof; and means carried by said supporting surface rearwardly of said reels for joining the cable straps fixedly together along their lengths in contacting relationship to form a continuous flexible unitary multistrap cable, each cable strap being movable off its reel and to said joining means as said reel rotates relative to said vehicle, whereby the cable straps move into close proximity to each other and are joined by said joining means, said multistrap cable extending continuously rearwardly of said joining means for deposit on the ground as said vehicle moves over the ground.

2. Apparatus as set forth in claim 1, wherein is included means rearwardly of said joining means for covering said cable prior to depositing the same in the trench.

3. Apparatus as set forth in claim 1, wherein said cable strands are metallic, said joining means including a metal welding device.

4. Apparatus as set forth in claim 1, wherein is included a reel having a flexible, heat sensitive wrapping strip wound thereon, said strip being movable off its reel and rearwardly thereof with said cable in close proximity to the latter, structure adjacent to the path of travel of said strip for wrapping the same about said cable as the strip and cable move rearwardly, and means coupled with said strip for applying heat thereto to secure the same about said cable.

5. Apparatus for laying a multistrand, electrically conducting cable in the ground comprising: a vehicle movable over the ground adjacent to a trench formed therein; a plurality of first generally coplanar reels rotatably carried by said vehicle, each reel having a flexible, electrically conducting strap wound thereon, each strap extending outwardly from its reel and rearwardly thereof with respect to the direction of movement of the vehicle; means carried by said vehicle rearwardly of said reel for placing the individual straps in side-by-side relationship to each other and for joining said straps when the same are in said relationship to thereby form a multistrap cable, each strap being movable off its reel and to said receiving means as said reel rotates relative to said vehicle, whereby said cable is successively formed as the straps move continuously off their respective reels; a second reel rotatably carried on said vehicle rearwardly of said receiving means and having a flexible, heat sensitive wrapping strip wound thereon, said strip being movable off said second reel and rearwardly thereof along a path of travel in close proximity to and below the path of travel of the cable extending rearwardly of said receiving means; structure adjacent to said path of travel of the strip for wrapping the same about said cable as the strip and cable move rearwardly; and means coupled with said strip for applying heat thereto to secure the same about said cable in covering relationship thereto, said covered cable extending rearwardly of said heat applying means for deposit in said trench as said vehicle moves over the ground.

6. A method of forming and laying a laminated cable on the ground comprising the steps of: providing a plurality of generally coplanar coils of individual cable straps on a movable vehicle; unwinding the cable straps from their coils at respective locations in proximity to each other as the vehicle moves forwardly; directing the straps rearwardly to a joining region while the straps remain in relatively close proximity to each other; fixedly joining said cable straps together along their lengths in contacting relationship have at said region to form a multistrap cable continuously feeding the multistrap cable rearwardly of said region and depositing the formed cable on the ground, the directing, joining and depositing steps occurring as the vehicle continues to move forwardly.

7. A method as set forth in claim 6, wherein is included the step of covering the cable before the same is deposited on the ground.

8. A method as set forth in claim 6, wherein are included the steps of wrapping the formed cable with a flexible, heat sensitive wrapper, and applying heat to the wrapper to secure the same in place in covering relationship to the cable.

9. A method as set forth in claim 6, wherein the coils are unwound in response to the depositing of the cable on the ground.

10. Apparatus for forming a laminated cable and for laying the same on the ground comprising: a vehicle movable over the ground; a plurality of reels rotatably carried by said vehicles, said reels forming two banks, each reel having a flexible cable strap wound thereon; and means carried by said vehicle rearwardly of said reels for joining the cable straps thereof to form a multistrap cable, each cable strap being movable off its reel and to said joining means as said reel rotates to said vehicle whereby the cable straps move into close proximity to each other and are joined by said joining means, said cable extending rearwardly of said joining means for deposit on the ground as said vehicle moves over the ground, said joining means being movable relative to said banks and transversely of the path of travel of the vehicle whereby the reels of said banks may be alternately used to form said cable.

11. A method of forming and laying a laminated cable on the ground comprising the steps of: providing a pair of side-by-side banks of coils with each bank including a plurality of generally coplanar coils of individual cable straps and with one of the banks being aligned with a region spaced therefrom; unwinding the cable straps from the coils of said one bank as the coils of the other bank remain in a standby condition; directing the straps of said one bank to said region with the straps being in relatively close proximity to each other; joining said cable straps together in said region to form a multistrap cable; moving the coils and said region in one direction relative to the ground as the coils continue to unwind and as the straps continue to be joined in said region; depositing the formed cable on the ground simultaneously with the movement of said coils and said region in said direction; and positioning the region in alignment with the other bank of coils after the coils of said one bank have become depleted, whereby the straps of said other banks may be unwound from their coils and joined together to provide a substantially continuous cable forming a laying operation.

(References on following page)

References Cited

UNITED STATES PATENTS

| | | | |
|---|---|---|---|
| 280,764 | 7/1883 | Rafer et al. | 29—202.5 |
| 327,474 | 9/1885 | Spalding | 254—134.3 |
| 1,298,644 | 4/1919 | Beaver et al. | 156—54 X |
| 1,829,162 | 10/1931 | Solter et al. | 61—72.6 |
| 2,792,852 | 5/1957 | Talbot et al. | 140—71 |
| 2,808,492 | 10/1957 | Yohe | 156—54 X |
| 3,053,037 | 9/1962 | Burr | 57—12 |
| 3,132,416 | 5/1964 | Hait | 61—72.1 X |
| 3,137,985 | 6/1964 | Bailey | 57—13 |
| 3,154,112 | 10/1964 | St. Jacques | 140—71 |

EARL J. WITMER, Primary Examiner

U.S. Cl. X.R.

29—202.5, 429; 140—71